(12) United States Patent
Nelson et al.

(10) Patent No.: US 6,574,071 B2
(45) Date of Patent: Jun. 3, 2003

(54) DISK DRIVE WITH HELICALLY MOUNTED DISK DRIVE MOTOR

(75) Inventors: Michael Paul Nelson, Kaysville, UT (US); Arulmani Ethirajan, Singapore (SG)

(73) Assignee: Iomega Corporation, Roy, UT (US)

( * ) Notice: Subject to any disclaimer, the term of this patent is extended or adjusted under 35 U.S.C. 154(b) by 204 days.

(21) Appl. No.: 09/797,059

(22) Filed: Feb. 27, 2001

(65) Prior Publication Data

US 2002/0118486 A1 Aug. 29, 2002

(51) Int. Cl.[7] ............................................. G11B 17/028

(52) U.S. Cl. .............................. 360/99.04; 360/99.08; 360/99.09

(58) Field of Search ........................... 360/99.04, 99.08, 360/99.09, 98.07; 310/156.08

(56) References Cited

U.S. PATENT DOCUMENTS

| | | | | |
|---|---|---|---|---|
| 5,461,523 A | * | 10/1995 | Hoshi | 360/99.12 |
| 5,610,780 A | * | 3/1997 | Nishizawa | 360/99.04 |
| 5,673,157 A | * | 9/1997 | Ycas et al. | 360/97.01 |
| 6,002,547 A | * | 12/1999 | Nicklos | 360/99.04 |
| 6,064,548 A | * | 5/2000 | Nicklos | 360/99.02 |
| 6,128,151 A | * | 10/2000 | Ma et al. | 360/73.03 |
| 6,191,913 B1 | * | 2/2001 | Nicklos | 360/99.04 |
| 6,236,536 B1 | * | 5/2001 | Ma et al. | 360/99.08 |
| 6,301,082 B1 | * | 10/2001 | Sonderegger et al. | 360/266.2 |
| 6,333,834 B1 | * | 12/2001 | Iftikar et al. | 360/133 |

\* cited by examiner

Primary Examiner—Jefferson Evans
(74) Attorney, Agent, or Firm—Woodcock Washburn LLP

(57) ABSTRACT

A disk drive receives a removable storage disk thereinto and has a frame and a disk motor helically mounted thereto for engaging the disk and applying a rotating force thereto. The motor has first threads integral therewith and the frame has second, mating threads integral therewith. The first and second threads interact to achieve helical movement.

15 Claims, 7 Drawing Sheets

US 6,574,071 B2

DISK DRIVE WITH HELICALLY MOUNTED DISK DRIVE MOTOR

FIELD OF THE INVENTION

The present invention relates to a helically mounted motor. More particularly, the present invention relates to such a motor mounted in a disk drive for driving a disk within an inserted cartridge.

BACKGROUND OF THE INVENTION

A disk drive for receiving a removable disk cartridge is known. Examples of a disk drive include a conventional 3.5 inch 'floppy' disk drive, a "ZIP" disk drive as developed and marketed by IOMEGA Corporation of Roy, Utah, and the like. Such a disk drive is typically coupled to a processor or the like, and facilitates an exchange of information between the processor and a disk contained within the disk cartridge. The disk and the disk drive may be magnetically or optically based, for example.

The disk cartridge typically includes an outer casing or shell that houses the aforementioned disk therein. The disk is mounted on a hub and can rotate freely within the cartridge. Typically, the disk drive includes a frame or chassis and a disk motor which is mounted thereto, wherein during operation of the drive, the motor engages the hub of the disk and applies a rotating force thereto.

In one arrangement, the inserted disk resides in an X-Y plane and the motor is moved into contact with the disk (rather than the disk being moved into contact with motor) in a direction generally perpendicular to the X-Y plane of such inserted disk, i.e., along a Z-axis. Moreover, such movement of such motor is actuated as part of receiving and retaining the disk cartridge in the frame. Accordingly, the motor is movable along the Z-axis between a disk-engagement or loaded position and a disk-separation or unloaded position.

In one arrangement, such a disk motor is helically mounted to the frame, and thus moves in a helical manner about the Z-axis between the disk-engagement position and the disk-separation position and into contact with the disk to rotate such disk. That is to say, rotation of the body of the motor about the Z-axis achieves displacement of such motor along such Z-axis. Typically, the motor is coaxially mounted to a baseplate which is positioned within and coaxially movable within a coaxial aperture defined within the frame.

In one such prior art disk drive, the motor baseplate is provided with a coaxial inner load ring at a peripheral edge thereof and the aperture is provided with a coaxial outer load ring at a peripheral edge thereof such that the inner load ring resides just within the outer load ring and the rings in combination define a helical mount. That is, one of the load rings includes a plurality of ramps and the other of the load rings included a plurality of guides that ride respective ones of the ramps, whereby the ramps and guides of the load rings in combination impart the helical mounting functionality to the disk motor and disk drive. Such a prior art disk drive is shown and discussed in much greater detail in U.S. Pat. Nos. 6,002,547 and 6,064,548, each of which is hereby incorporated by reference in its entirety.

Importantly, each prior art load ring is a separate part that must be manufactured separately and mounted within the disk drive to either the frame or the motor base plate, as the case may be, in a separate construction step. Also, as a separate part, each load ring introduces tolerance requirements to the disk drive and therefore introduces ways in which the disk drive can be defective, either by being manufactured or mounted incorrectly. As may certainly be appreciated, such separate load rings therefore impart additional costs into the manufacture of the disk drive.

Accordingly, a need exists for a disk drive that does not require such prior art separate load rings. More particularly, a need exists for a disk drive that incorporates the load rings into the motor base plate and the frame, thereby eliminating the inner and outer load rings and the manufacturing, construction, tolerance, and cost issues associated therewith.

SUMMARY OF THE INVENTION

The present invention satisfies the aforementioned need by providing a disk drive for receiving a removable storage disk thereinto. The disk drive has a frame and a disk motor helically mounted thereto for engaging the disk and applying a rotating force thereto. The motor has first threads integral therewith and the frame has second, mating threads integral therewith. The first and second threads interact to achieve helical movement.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
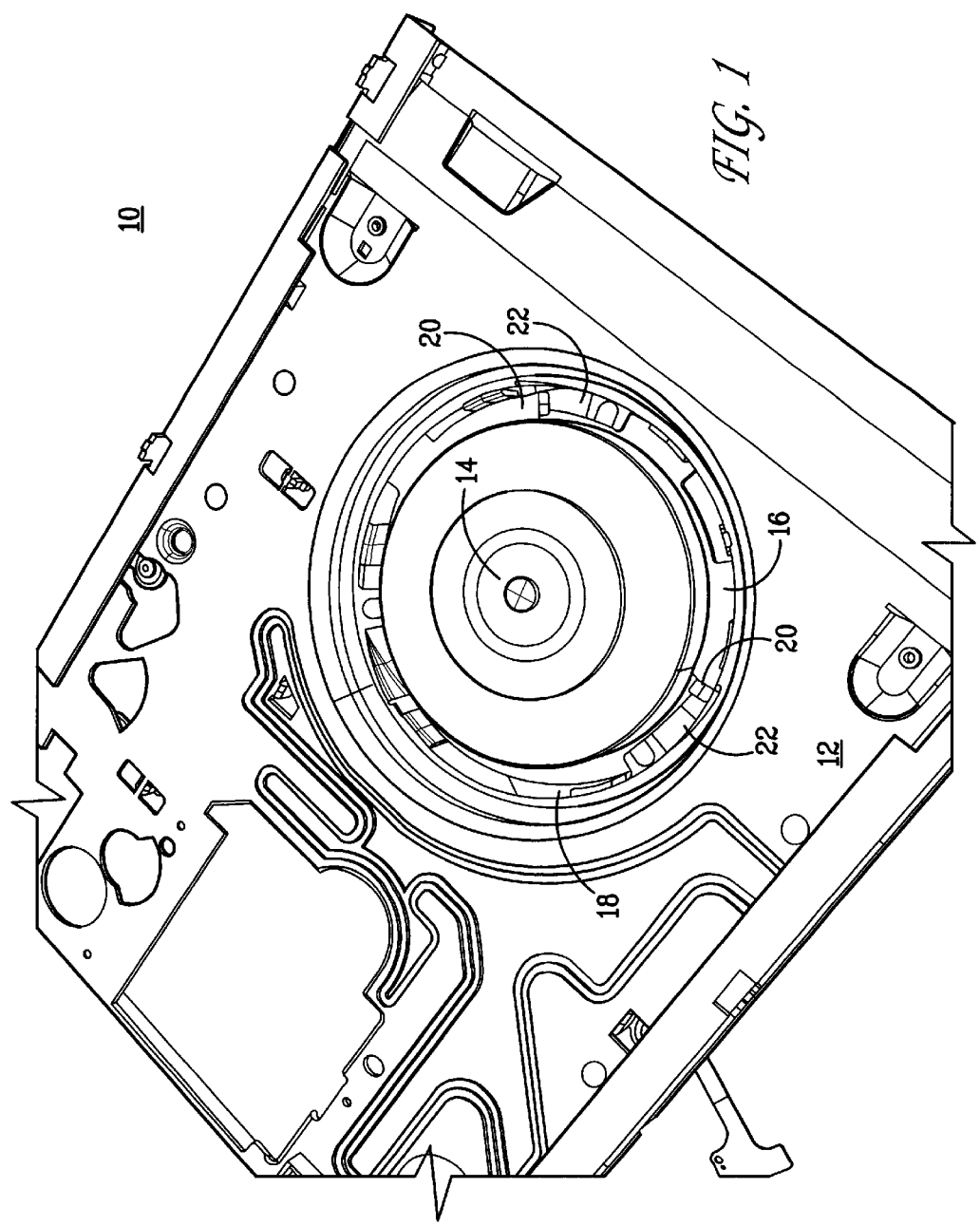
FIG. 1 is a top perspective view showing a disk motor helically mounted to a frame of a disk drive in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Referring now to FIGS. 1–6, there is shown a disk drive 10 in accordance with one embodiment of the present invention. As was discussed above, the disk drive 10 is for receiving a removable disk (not shown) such as a conventional 3.5 inch 'floppy' disk or a "ZIP" disk as developed and marketed by IOMEGA Corporation of Roy, Utah, and the like. The disk may be mounted on a generally coaxial hub or may define a generally coaxial aperture at the center thereof. Of course, the disk drive 10 may be for receiving any type of disk, magnetic, optical, or otherwise, with or without a hub, and with or without a cartridge (not shown), without departing from the spirit and scope of the present invention.

The disk drive 10 includes a frame or chassis 12 and a disk motor 14 which is helically mounted thereto, wherein during operation of the drive 10, the motor 14 engages the disk at the hub or aperture thereof and applies a rotating force thereto. The disk is inserted into the drive 10 so as to resides within an X-Y plane that is generally parallel to and within the general extent of the frame 12 of the drive 10, and the motor 14 is helically moved into a loaded position and into contact with the disk 10 along a Z-axis generally perpendicular to the X-Y plane. Upon ejection of the disk, the motor 14 is helically moved back out to an unloaded position and out of contact with the disk 10 along the Z-axis. Such helical movement of the motor 14 to either position may be concurrent with or separate from the corresponding disk movement. Further features of the disk drive 10 not discussed herein may be found in the aforementioned U.S. Pat. Nos. 6,002,547 and 6,064,548, each of which is again hereby incorporated by reference in its entirety.

As seen, the motor 14 is generally coaxially mounted to a baseplate 16 which is positioned within and generally coaxially movable within a generally coaxial aperture 18 defined within the frame 12. As may be appreciated, the baseplate 16 may be dispensed with if appropriate, in which case features discussed below as residing on such baseplate 16 are instead resident on such motor 14.

In one embodiment of the present invention, and as seen, the prior art motor load rings discussed above are eliminated and the helical mount functionality thereof is collectively incorporated into and integral to the motor baseplate 16 (or motor 14 directly) and the frame 12. In particular, and as seen, the motor baseplate 16 has threads 20 integral therewith (FIGS. 1 and 3), and the frame 12 has mating threads 22 integral therewith (FIGS. 1 and 4), and the threads 20, 22 interact to achieve helical movement. In particular, and as may be appreciated, the threads 20, 22 convert rotary motion of the motor 14 on the baseplate 16 into Z-axis movement, whereby the motor may be moved into and out of engagement with an inserted disk.

Figure 3:
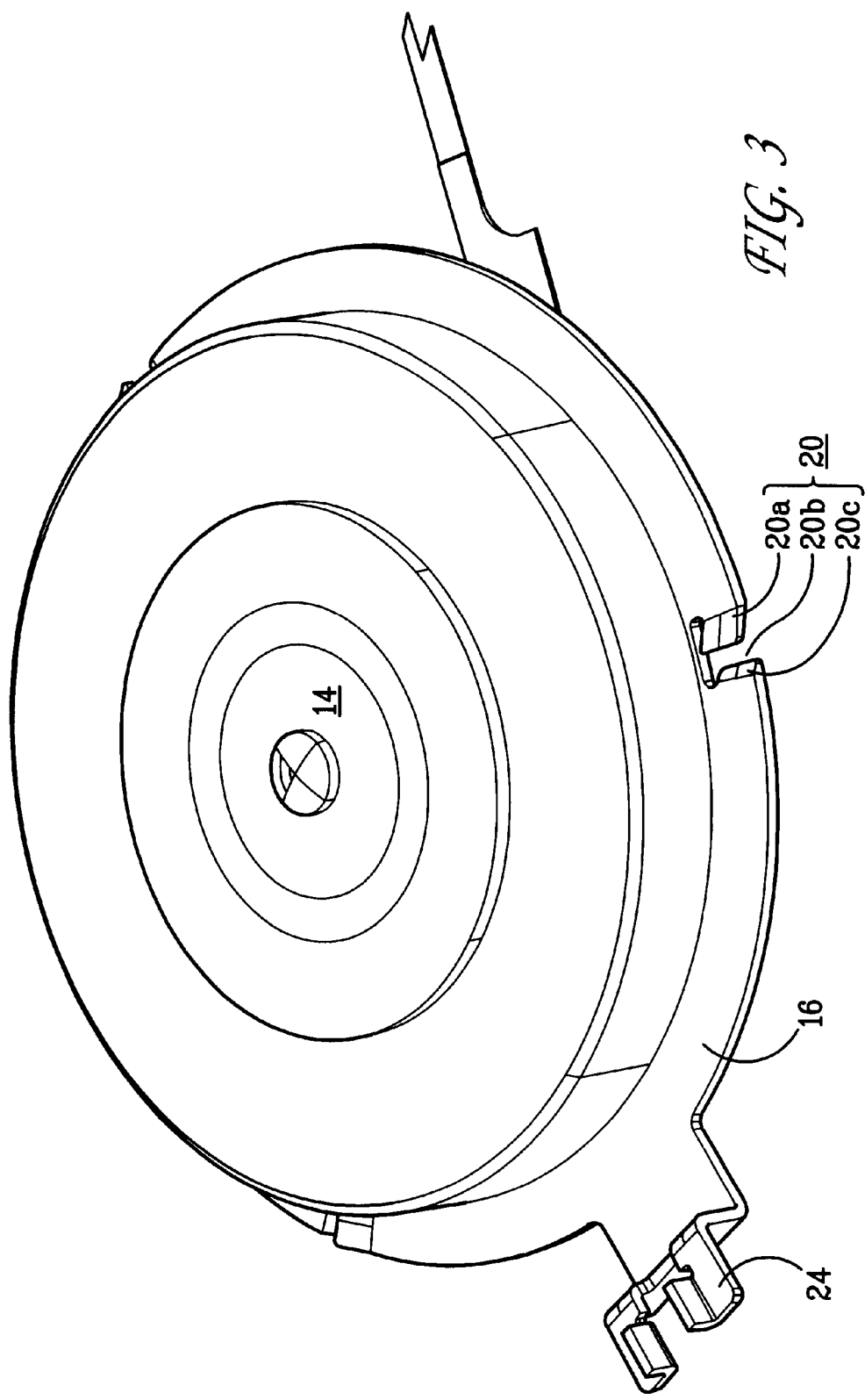
FIG. 3 is a top perspective view of the disk motor and associated motor baseplate of FIGS. 1 and 2.

The threads 20, 22 may be any appropriate threads, such as for example ramps (threads 22) and guides (threads 20) that ride respective ones of the ramps. As shown, the ramps are integral to the frame 12 and the guides are integral to the baseplate 16. As best seen in FIG. 3, the baseplate 16 at a peripheral edge thereof defines for each guide a rider 20a that is in contact with the upper side of the corresponding ramp, an adjacent slot 20b through which the ramp passes, and a stop 20c adjacent the slot 20b on a side thereof opposite the rider 20a which limits upward movement of the baseplate 16 away from the aperture 18. Of course, the ramps may instead be integral to the baseplate 16 while the guides are integral to frame 12.

Figure 4:
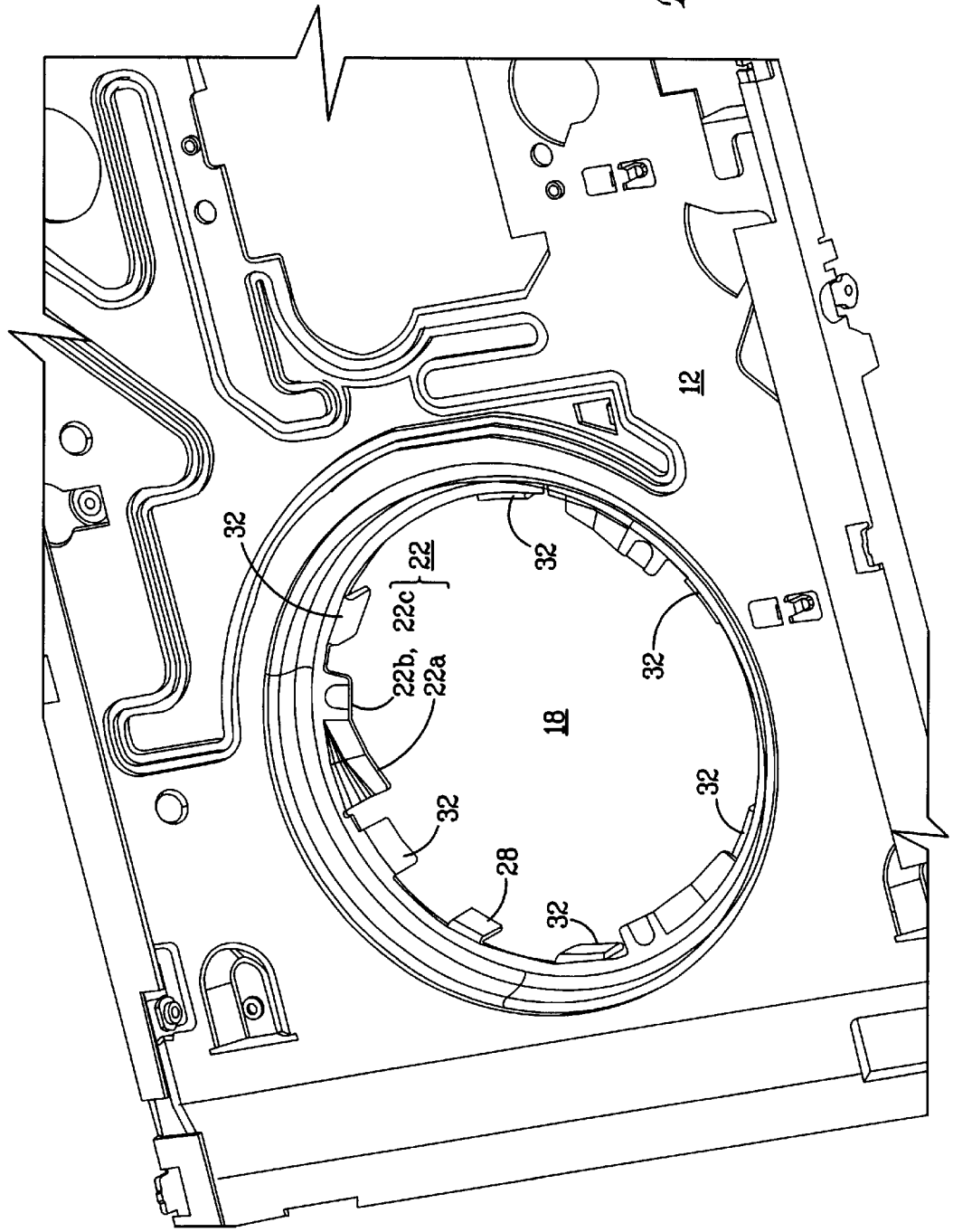
FIG. 4 is a top perspective view of the frame of the disk drive of FIGS. 1 and 2.
Figure 5:
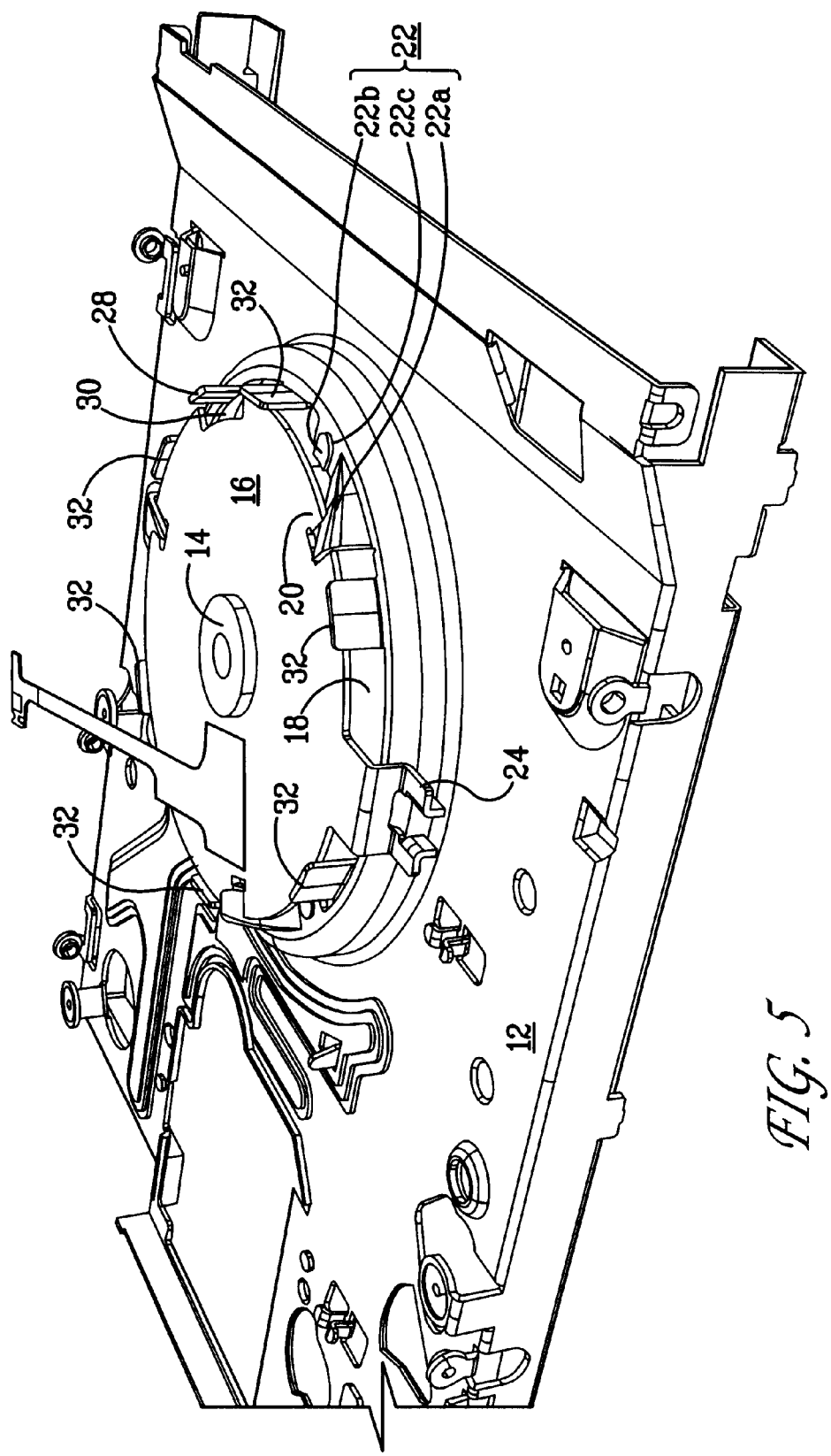
FIG. 5 is a bottom perspective view of the disk motor and disk drive of FIG. 1, with the motor in an un-loaded position.
Figure 6:
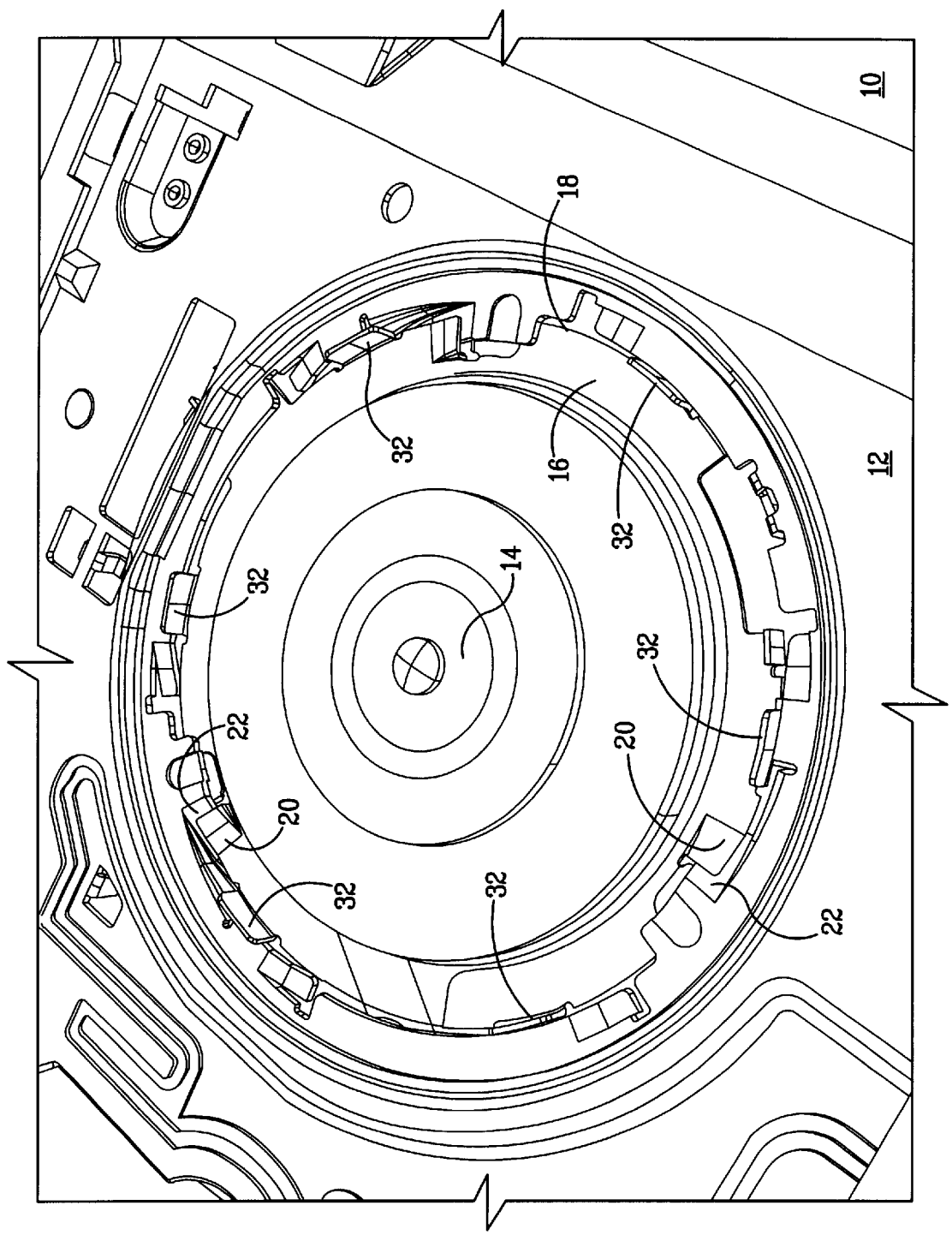
FIG. 6 is a close-up top perspective view of the disk motor as helically mounted within the disk drive of FIGS. 1 and 2 in an alternate embodiment of the present invention.

In one embodiment of the present invention, and as best seen in FIGS. 4 and 5, each ramp shown as the threads 22 includes a transition surface 22a which creates movement along the Z-axis, and a load surface 22b contacted by a corresponding thread 20 on the baseplate 16 when the motor 14 and baseplate 16 are in the loaded position of FIG. 1. Moreover, each load surface 22b rests on a half shear 22c having a defined height with regard to the Z-direction. In the embodiment shown in FIGS. 1–6, each half shear 22c is on the underside of the frame 12. As may be appreciated, then, the half shears 22c collectively act as registrations that accurately locate the motor 14 and baseplate 16 at the proper Z-height in the loaded position. Alternately, the half shears 22c may be appropriately positioned on the baseplate 16 adjacent the peripheral edge thereof to contact the frame 12 (not shown). In either case, when the motor 14 and baseplate 16 are in the loaded position, the half shears 22c are in contact with an opposing surface to accurately register and locate the motor 14 and baseplate 16 with respect to an inserted disk (not shown).

Figure 2:
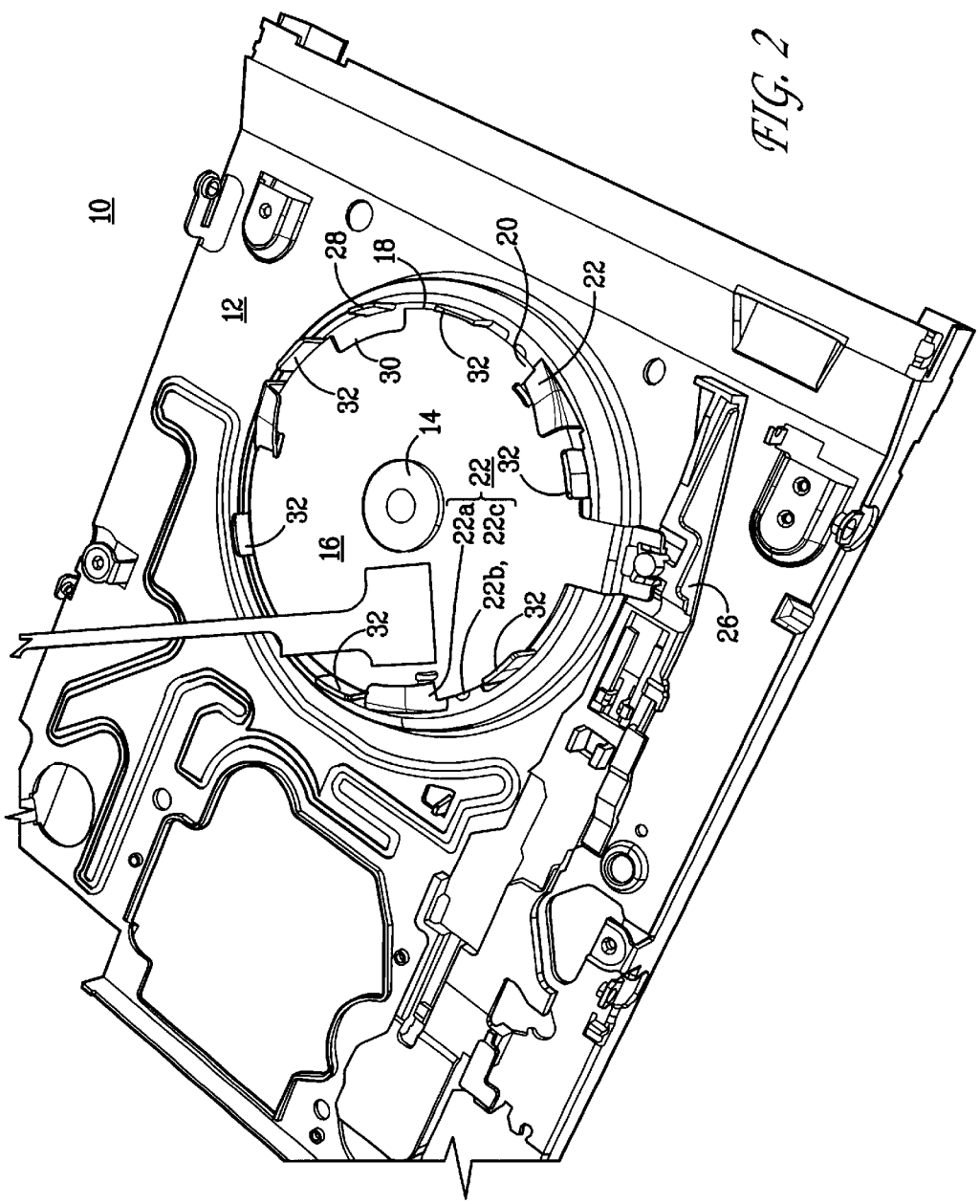
FIG. 2 is a bottom perspective view of the disk motor and disk drive of FIG. 1, with the motor in a loaded position.

The motor 14 with the baseplate 16 mounted thereto is mounted to the frame 12, then, by aligning the threads 20, 22 and rotating the motor 14, for example to the loaded position such as that seen in FIGS. 1 and 2. In one embodiment of the present invention, the baseplate 16 also includes a motor yoke 24 (FIGS. 2 and 3) incorporated thereinto and integral thereto. As seen, the yoke 24 engages a motor actuating member such as a drag link 26 (FIG. 2) upon installation. As may be appreciated, the drag link 26 controls and actuates the motor 14 on the baseplate 16 in the course of helical movement between the loaded and unloaded positions as defined by the threads 20, 22. That is, when the motor actuating member/drag link 26 is stroked, the motor 14 rotates between the motor loaded position of FIGS. 1 and 2 and the motor unloaded position of FIG. 5.

In one embodiment of the present invention, the frame 12 also includes a bend tab 28 (FIGS. 2 and 5) incorporated thereinto and integral thereto and adjacent the defined aperture 18. Thus, with the motor 14 and baseplate 16 helically mounted to the frame 12 by way of the threads 20, 22, the bend tab 28 on the frame 12 is bent into a slot 30 defined on a peripheral edge of the motor baseplate 16 and appropriately positioned with respect thereto. Alternately, a bend tab 28 incorporated into and integral to the baseplate 16 is bent into a slot 30 defined on the frame 12 (not shown). In either case, the bend tab 28 in the slot 30 limits the motor baseplate 16 stroke (i.e., circumferential movement) and retains the motor baseplate 16 and motor 14 within the frame 12. The bend tab 28 also ensures that the motor does not fall out of the threads 20, 22 during shock loading.

Figure 7:
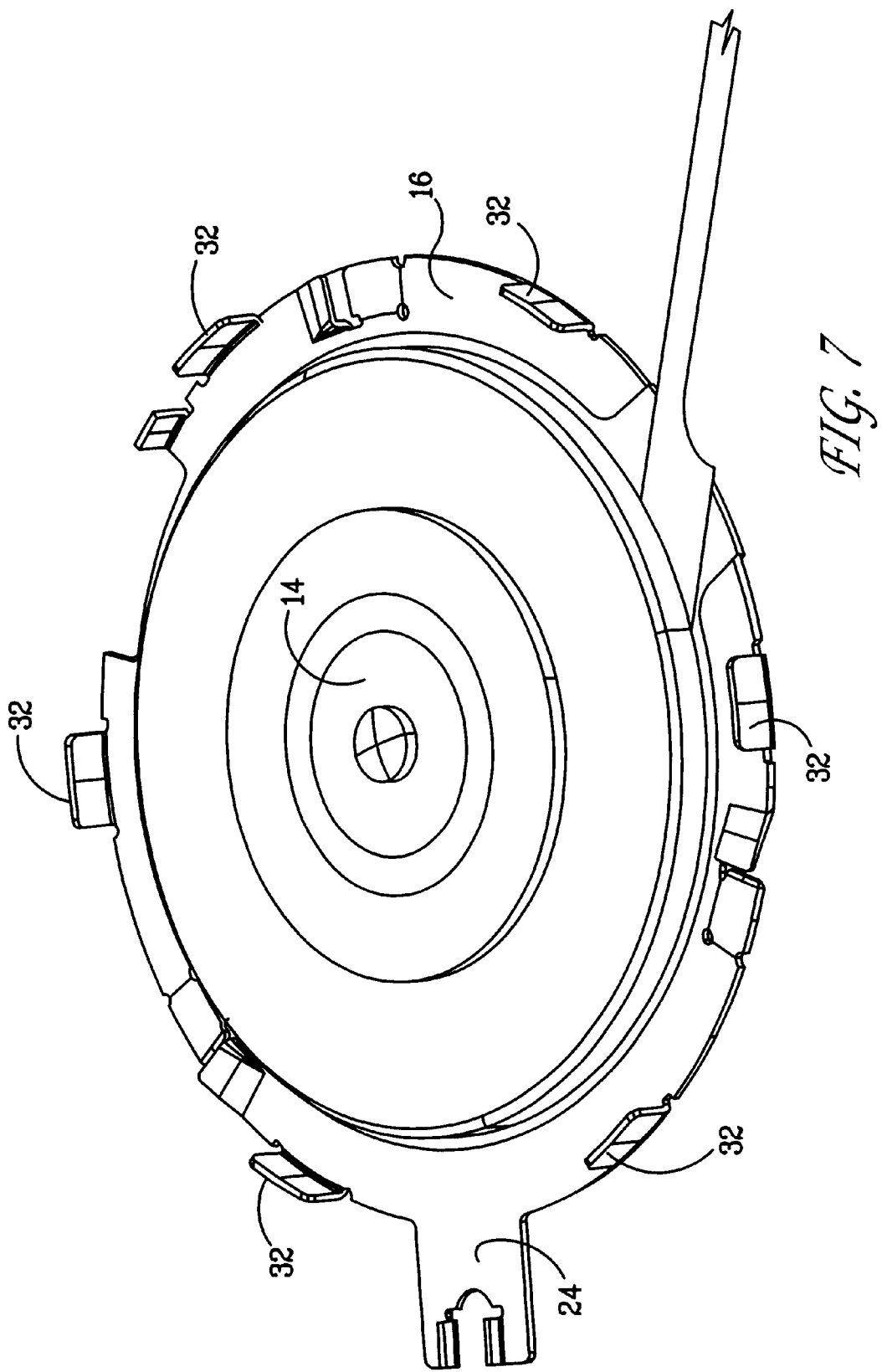
FIG. 7 is a top perspective view of the disk motor and associated motor baseplate of FIG. 6.

In one embodiment of the present invention, the frame 12 also includes a plurality of X-Y centering tabs 32 (FIGS. 2 and 5) incorporated thereinto and integral thereto and spaced about the defined aperture 18 adjacent thereto. As may be appreciated, such tabs 32 contact and interact with the peripheral edge of the baseplate 16. Thus, the motor 14 and baseplate 16 may be accurately centered in the aperture 18 defined by the frame 12 by appropriate location and adjustment of such X-Y centering tabs 32, at least with regard to the aforementioned X-Y plane that is generally parallel to and within the general extent of the frame 12 of the drive 10. Alternately, the X-Y centering tabs 32 are incorporated into and integral to the baseplate 16 and spaced about the peripheral edge thereof (FIGS. 6 and 7) to contact and interact with the edge of the frame 12 that defines the aperture 18. In either case, the tabs 32 center the motor baseplate 16 to align the axis of the motor 14 thereon with the axis of the aperture 18.

Typically, both the frame 12 and motor baseplate 16 are formed from a metal. Accordingly, in the present invention, the frame 12 and motor baseplate 16 contact one another and move past each other in a direct metal-to-metal manner. Thus, it is preferable that such elements are fitted to each other and with reference to the X-Y centering tabs 32 in a relatively loose and non-interfering manner. Nevertheless, such tabs 32 should achieve the centering function described above. Such tabs 32, then, may for example define a clearance of about 0.2 mm or so when the elements are fitted to each other.

It is to be appreciated, though, that with the aforementioned loose, non-interfering fit, loading of the motor 14 by way of the yoke 24 and drag link 26 results in a bias on the motor 14 and baseplate 16 toward one side of the aperture 18 defined by the frame. As may be appreciated, such a bias results in the axis of the motor 14 being shifted out of alignment with the axis of the aperture 18. Accordingly, in one embodiment of the present invention, the X-Y centering tabs 32 are positioned to take the bias into account. Thus, the motor 14 axis is offset from the aperture 18 axis by an amount equal to the bias distance.

The frame 12 and motor baseplate 16 of the present invention may be respectively formed from any appropriate material, such as a metal or elastomer, without departing from the spirit and scope of the present invention. Likewise the methods of forming the frame 12 and motor baseplate 16 of the present invention may be any appropriate method, such as stamping, machining, molding, and a combination thereof, without departing from the spirit and scope of the present invention.

In the foregoing description, it can be seen that the present invention comprises a new and useful disk drive that does not require separate load rings, but instead incorporates the load rings into the motor base plate and the frame. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A disk drive for receiving a removable storage disk thereinto and comprising a frame and a disk motor helically mounted thereto for engaging the disk and applying a rotating force thereto, the motor having first threads integral therewith and the frame having second, mating threads integral therewith, the first and second threads interacting to achieve helical movement.

2. The disk drive of claim 1 wherein the motor is mounted to a baseplate and the baseplate has the first threads integral therewith.

3. The disk drive of claim 1 wherein the frame defines an X-Y plane within which the received disk generally resides and the motor is helically movable along a Z-axis generally perpendicular to the X-Y plane between a loaded position in engagement with the disk and an unloaded position out of engagement with the disk.

4. The disk drive of claim 1 wherein the frame defines an aperture and the motor is generally coaxially positioned within and generally coaxially movable within the aperture.

5. The disk drive of claim 4 wherein the motor is generally coaxially mounted to a baseplate which is positioned within and generally coaxially movable within the aperture.

6. The disk drive of claim 4 wherein the frame includes a plurality of centering tabs integral thereto and spaced about the aperture adjacent thereto, the tabs interacting with a peripheral edge of the motor to center the motor within the aperture.

7. The disk drive of claim 4 wherein the motor includes a plurality of centering tabs integral thereto and spaced about a peripheral edge thereof, the tabs interacting with a peripheral edge of the frame at the aperture to center the motor within the aperture.

8. The disk drive of claim 4 wherein the motor is fitted to the frame in a non-interfering manner.

9. The disk drive of claim 8 wherein the motor in a loaded position in engagement with the disk is biased toward one side of the aperture, and wherein the frame includes a plurality of centering tabs integral thereto and spaced about the aperture adjacent thereto, the tabs interacting with a peripheral edge of the motor to center the motor within the aperture, taking the bias into account.

10. The disk drive of claim 8 wherein the motor in a loaded position in engagement with the disk is biased toward one side of the aperture, and wherein the motor includes a plurality of centering tabs integral thereto and spaced about a peripheral edge thereof, the tabs interacting with a peripheral edge of the frame at the aperture to center the motor within the aperture, taking the bias into account.

11. The disk drive of claim 1 wherein the first and second threads comprise ramps and guides that ride respective ones of the ramps.

12. The disk drive of claim 11 wherein each guide comprises a rider in contact with the corresponding ramp, an adjacent slot through which the ramp passes, and a stop adjacent the slot on a side thereof opposite the rider which limits axial movement of the motor.

13. The disk drive of claim 11 wherein each ramp includes a transition surface which creates helical movement and a load surface contacted by the corresponding guide when the motor is in a loaded position in engagement with the received disk.

14. The disk drive of claim 13 wherein each load surface rests on a ledge having a defined height, wherein the ledges collectively act as registrations that accurately locate the motor in the loaded position with respect to the received and engaged disk.

15. The disk drive of claim 1 wherein one of the motor and the frame defines a slot and the other of the motor and the frame includes a bend tab integral thereto, the bend tab and slot being appropriately positioned with respect to each other and the bend tab being bent into the slot to limit movement of the motor with respect to the frame.

* * * * *